United States Patent [19]

Heyland et al.

[11] Patent Number: 4,544,568
[45] Date of Patent: Oct. 1, 1985

[54] CHEESE FLAVORING PRODUCT

[75] Inventors: Sven Heyland, Warth, Switzerland; Gaston Fournet, St-Lo, France; Hans Bösch, Wiesendangen, Switzerland

[73] Assignee: Nestec S. A., Vevey, Switzerland

[21] Appl. No.: 682,320

[22] Filed: Dec. 17, 1984

[30] Foreign Application Priority Data

Dec. 29, 1983 [CH] Switzerland ............... 6967/83

[51] Int. Cl.⁴ .............................................. A23L 1/227
[52] U.S. Cl. ..................................... 426/650; 426/613; 426/582
[58] Field of Search ................. 426/613, 582, 650

[56] References Cited

U.S. PATENT DOCUMENTS 3,922,365 11/1975 Ney et al. ................. 426/582 X
4,471,002 9/1984 Buckholz et al. .......... 426/650 X
4,500,549 2/1985 Crossman ................ 426/650 X

*Primary Examiner*—Joseph Golian
*Attorney, Agent, or Firm*—Vogt and O'Donnell

[57] ABSTRACT

A concentrated flavoring product imparting the flavor of cheese based on an aromatic fat containing aromatic substances from the crust of a hard or semihard cheese. It additionally contains vegetable protein hydrolyzate, leucine and a casein hydrolyzate.

10 Claims, No Drawings

CHEESE FLAVORING PRODUCT

This invention relates to a flavouring product which imparts the flavour of cheese and to a process for producing that product.

Known processes for the production of flavouring products which impart the flavour of cheese may be divided into three categories, namely those which comprise the fermentation of a suitable starting material with microorganisms producing an aromatic cheese note, those which use mixtures of aromatic constituents found in cheese and those which involve the concentration of aromatic fractions of cheese or cheese products.

One known process of the first category comprises spray-drying a culture medium containing at least one protein and at least one carbohydrate on which a non-toxic microorganism of the genus Bacillus and a non-toxic microorganism of the genus Streptococcus have been grown in symbiosis, mixing the aromatic powder thus obtained with fat and a powder of yeast and whey, extruding the resulting mixture and reducing the extruded strand into small fragments or granules. This process is very complicated.

In one known process of the second category, a flavour of blue cheese is imparted to certain foods by adding to them an effective quantity of 1-octene-3-ol and a 2-alkanone containing from 5 to 15 carbon atoms. This type of flavouring is highly specific.

One known process of the third category comprises finely grinding cheese, mixing with oil, stirring the resulting mixture for a few minutes at approximately 60° C., separating the oil charged with the cheese flavour, adding the dry residue to biscuits before they are placed in ovens and spraying the oil onto the biscuits as they leave the ovens. It may be said that, in this way, the cheese flavour is diluted in the oil.

The object of the present invention is to provide a concentrated flavouring product which imparts a characteristic and balanced cheese favour and also a process for producing that product on an industrial scale.

To this end, the flavouring product according to the invention which imparts the flavour of cheese is characterized in that it contains from 5 to 40 parts by weight of vegetable protein hydrolyzate, from 3 to 20 parts by weight of leucine and from 15 to 30 parts by weight of aromatic fat containing aromatic substances from the crust of a hard or semihard cheese.

Preferably, the flavouring product according to the invention additionally contains from 1 to 20 parts by weight of monosodium glutamate, from 1 to 5 parts by weight of sodium chloride, from 1 to 20 parts by weight of casein hydrolyzate and from 1 to 20 parts by weight of whey powder.

The process according to the invention for producing a flavouring product which imparts the flavour of cheese is characterized in that an aromatic fraction containing aromatic substances is separated from the crust of a hard or semihard cheese and made into an aromatic fat which is mixed in a quantity of from 15 to 30 parts by weight with from 5 to 40 parts by weight of vegetable protein hydrolyzate and from 3 to 20 parts by weight of leucine.

From 1 to 20 parts by weight of monosodium glutamate, from 1 to 5 parts by weight of sodium chloride, from 1 to 20 parts by weight of casein hydrolyzate and from 1 to 20 parts by weight of whey powder are preferably added to the mixture.

In the context of the invention, the expression "crust (of cheese)" is to be understood to mean the outer part of individual cheeses, such as wheels of Gruyere or Emmental for example, hardened in air and representing approximately 3 to 4% of the total weight of the cheese.

It has been found to be possible to produce a concentrated flavouring product which imparts a characteristic and balanced cheese flavour from certain cheese crusts which, hitherto, have never been utilized in the field of human nutrition. Cheese crusts are very difficult to utilize because they have an extremely bitter taste. It has been found to be possible to extract from cheese crusts an aromatic fraction which may form part of the composition of a flavouring product and make it capable of imparting a characteristic cheese flavour. However, this was only found to be possible on condition that the composition of the product also included specific, adequate ingredients which make it capable of imparting a cheese flavour which is not only characteristic but also balanced.

In the product according to the invention, the vegetable protein hydrolyzate serves as a source of amino acids intended to balance the flavour. A neutralized and decolored acid hydrolyzate of an oilseed cake is particularly suitable for that purpose.

The leucine has a totally unexpected synergistic or strengthening effect on the flavour. This effect may be observed particularly clearly when the leucine has a degree of purity of at least 60%. A leucine which is particularly suitable for the purposes of the invention may be obtained, for example, by filtering a neutralized acid hydrolyzate of vegetable proteins and recrystallizing the filtrate.

The indicated contents of vegetable protein hydrolyzate and leucine in the product according to the invention were decided after numerous organoleptic tests. They indicate that quantity of each ingredient which the product should at least contain for the effect expected of each ingredient to be perceptible and those quantities which should not be exceeded if a significant imbalance is not to be produced.

The aromatic fat mentioned acts as carrier for the characteristic flavour. It may consist of the actual fat of the crust or may be another fat, particularly a vegetable oil flavoured by aromatic substances extracted from the crust of a hard or semihard cheese. The cheese in question is preferably of the Emmental or Gruyere type.

The indicated content of aromatic fat in the product according to the invention, namely from 15 to 25 parts by weight, is such that the product is capable of imparting a perceptible characteristic flavour of cheese whilst remaining in powder form.

In the preferred embodiment of the product according to the invention as described in the foregoing, the monosodium glutamate and the sodium chloride act as flavour enhancers.

The casein hydrolyzate is also a source of amino acids and peptides. It has a degree of hydrolysis of preferably from 35 to 45%, which in the context of the invention means that from 35 to 45% of the total nitrogen has been solubilized by hydrolysis and remains in solution at pH 4.7. A hydrolyzate such as this is degraded to a far greater extent than a ripened cheese. It is very bitter if it is tasted as such. However, it has been found that it enables the flavour imparted by the flavouring product according to the invention to be balanced in a surprising and remarkable manner. The balance attainable is not as satisfactory when the degree of hydrolysis of the hydrolyzate is below 35% whereas, beyond 45%, it is for all that upset by a certain bitterness. A casein hydrolyzate which is particularly suitable for use in the product according to the invention may be obtained by degradation with strains of Penicillium camemberti or candidum.

The whey powder acts above all as a dispersant for the fat and represents an effective aid in preventing the product according to the invention from solidifying.

To carry out the process according to the invention, it is possible to use, for example, the crusts which accumulate during the vacuum wrapping of portions of Emmental or Gruyere, for example those of the type sold in supermarkets. In that case, the wheels of cheese are first lightly scraped over their surface, which represents a removal of approximately 1% of the weight of an Emmental cheese for example. These first scrapings are discarded. The crust is then shaved to a depth of a few mm, which represents about 2 to 3% of the total weight of the cheese. The shavings obtained are particularly suitable for use in the process according to the invention.

The actual fat may be directly separated from the crust by pressing and/or centrifuging in order to obtain the aromatic fat mentioned. To this end, it is possible for example to crush the crust between the plates of a press under a pressure of from 15 to 30 bars at a temperature in the range from 40° to 60° C. Preferably, the fat thus expressed is then pasteurized.

The aromatic fraction mentioned may also be separated by stripping the crust with steam and the aromatic fat prepared by extracting the aromatic substances from the distillate with a fat other than that of the crust, more particularly with a vegetable oil. To this end, it is possible, for example, to suspend the finely divided crust, for example in the form of shavings or scrapings, in a certain quantity of water, after which the pH of the resulting suspension may be adjusted to around pH 4 for example to release the volatile fatty acids which would be immobilized in the form of salts, the temperature of the suspension increased to 100° C. and a certain quantity of steam at atmospheric pressure passed through the suspension, the steam becoming charged in particular with volatile fatty acids which are recovered as distillate. Where this procedure is adopted, it is of advantage to use a quantity by weight of steam which is substantially equal to the weight of the shavings. If a smaller quantity is used, less aromatic substances are extracted whereas, with a larger quantity, the aromatic substances are diluted. If necessary, the distillate may then be purified, in particular by treatment on polystyrene resin free from functional groups.

To extract the aromatic substances from the distillate, it is preferred to use a fat which is liquid or semi-liquid at ambient temperature. A fat having a very high melting point, such as beef tallow for example, gives a product which leaves an impression of solidified fat in the mouth. Accordingly, it is preferred to use an oil, particularly butter oil or vegetable oils, such as sunflower or peanut oil. The fact that a highly liquid fat could impart to the product a tendency to stick is compensated by the presence of the other ingredients which act as a dispersant or absorbent for the fat.

To facilitate the extraction of the aromatic substances from the distillate, the distillate may first be saturated with sodium chloride. Thereafter, the distillate may for example be mixed with part of the oil selected, the resulting mixture stirred for a few minutes, the oil separated and the same operation repeated with another part of the oil selected.

In the preferred embodiment of the process according to the invention as described in the foregoing, from 1 to 20 parts by weight of casein hydrolyzate are incorporated in said mixture. A casein hydrolyzate having a degree of hydrolysis of from 35 to 45% is preferably incorporated. A hydrolyzate such as this may be obtained by degradation with strains of Penicilllium camemberti or candidum. To that end, skimmed milk for example may be inoculated with lactic ferments, the pH allowed to fall to a sufficiently low value to cause coagulation, the curd separated from the whey and the curd distributed over plates in a layer thickness of a few cm. It is also possible to start directly with commercially available acid casein which would then have to be reconstituted by the addition of water. An inoculum of Penicillium candidum or camemberti may then be sprayed over the plates and the strain left to ferment for about 7 to 15 days at 8° to 14° C. in a an atmosphere saturated with humidity. The mass of curd may then advantageously be ground and the strain left to continue fermenting for a few days. The product may then be pasteurized and spray-dried.

To prepare said mixture, it is preferred initially to mix the dry ingredients and then to spray on the aromatic fat while stirring. In the preferred embodiment of the process according to the invention as described in the foregoing, the vegetable protein hydrolyzate, the monosodium glutamate, the leucine, the whey powder, the casein hydrolyzate and the salt may first be mixed, the aromatic fat sprayed onto the resulting mixture while stirring and, finally, the mixture homogenized.

The product according to the invention may be used to impart a cheese flavour to sauces or to culinary preparations for example. It is also particularly suitable for flavouring potato crisps or cocktail biscuits. It is advantageously used in quantities by weight approximately three or four times smaller than the quantities of finely grated extra-hard cheese, of the Sbrinz or Parmesan type for example, which would be used for the same purpose.

If care is taken to use ingredients having a sufficiently low residual moisture content, i.e. below or equal to about 3–4%, in its production, the product according to the invention can have excellent keeping properties and can withstand, for example, storage at ambient temperature for more than 6 months without undergoing any significant change.

The invention is illustrated by the following Examples in which the parts and percentages quoted are by weight, unless otherwise indicated.

EXAMPLE 1

Crusts freshly shaved from Emmental and Gruyere cheeses are collected. The composition of these crusts is shown below along, for comparison, with the composition of Emmental cheese:

|  | Gruyere crust % | Emmental crust % | Emmental cheese % |
| --- | --- | --- | --- |
| Dry matter | 69.3 | 79.0–80.3 | 58.3 |
| Fat | 30.9 | 36.2–37.3 | 32.3 |
| Total nitrogen | 4.0 | 5.2–5.9 | 4.5 |
| α-amino nitrogen | 0.31 | 0.14–0.69 | 0.05 |
| Ash | 8.7 | 4.1–6.8 | 3.3 |
| Chloride (measured as | 1.4 | 0.63–1.1 | 0.44 |

| | Gruyere crust % | Emmental crust % | Emmental cheese % |
|---|---|---|---|
| NaCl) | | | |

Two parts of Emmental crust and one part of Gruyere crust are pressed in a hydraulic press (23 bars/50° C.), 27% of aromatic fat being expressed therefrom. The fat obtained is pasteurized by heating for 5 minutes at 98° C.

A skimmed milk is inoculated with lactic ferments. Fermentation is stopped at pH 4.4. The serum is separated from the curd. The curd is spread over plates in a layer 3 cm thick. An inoculum of Penicillium candidum is sprayed over the curd. The plates are then left for 10 days in air having a humidity content of 98% at a temperature of 11°–12° C. The curd is then ground and left standing for another 4 days under the same conditions. It is then pasteurized and spray-dried. A casein hydrolyzate having a degree of hydrolysis of 42.8% and a dry matter content of 96% is thus obtained.

In addition, technical leucine having a dry matter content of 99.6% and containing 65% of pure leucine, 13% of Cl$^-$, 18% of isoleucine and 2% of valine, the remainder consisting primarily of ash and phenylalanine, is collected by filtering a neutralized acid hydrolyzate of peanut cake and recrystallizing the filtrate.

In a horizontal mixer in the form of a cylindrical vessel along the horizontal axis of which rotates a shaft fitted with radial arms, 19.5 kg of a neutralized and decolored acid hydrolyzate of peanut cake having a dry matter content of 98%, 16 kg of the above technical leucine, 7.25 kg of monosodium glutamate, 4.25 kg of sodium chloride, 15 kg of whey powder having a dry matter content of 97% and 15 kg of the above casein hydrolyzate are dry-mixed, after which 23 kg of the above pasteurized aromatic fat are sprayed onto the dry ingredients while mixing. The mixture is then homogenized.

A flavouring product in the form of fine, light, free-flowing particles is obtained. It has the appearance of a finely ground extra-hard cheese, but with approximately four timesthe flavouring power. Its dry matter content is above 96% and it keeps for at least 6 months at ambient temperature. This flavouring product tasted in a quantity of a few grains on the tongue releases a perfectly balanced and characteristic flavour of cheese.

APPLICATION EXAMPLES

The flavouring product obtained in Example 1 is successfully used (a) in an instant cheese sauce containing starch, flour, milk powder, flavour enhancers and spices, in a quantity of 7% of flavouring product based on the total weight of the instant sauce, which is equivalent to 10 g of flavouring product per 1 of reconstituted sauce, (b) in a dry cheese-souffle mix in a quantity of 5% of flavouring product based on the total weight of the dry mix in combination with 10% of cheese powder, 220 g of dry mix being used to make 1 kg of souffle, (c) in a basic mixture for making a cheese sauce intended to form part of a dish based on pasta in a quantity of from 3 to 5% of flavouring product based on the total weight of the basic mixture which additionally contains cereal starch, spices and 10 to 15% of cheese powder, 110 g of basic mixture being used to make 1 kg of sauce, (d) in a dry mix for coating snacks containing maltodextrin and spices in a quantity of from 20 to 30% of flavouring product based on the total weight of the dry mix, 120 g of the dry mix being used to coat 1 kg of snack.

EXAMPLE 2

635 g of shavings of Emmental crust as described in Example 1 are suspended in 1.27 kg of water. The pH-value of the suspension is adjusted to pH 4, after which the suspension is introduced into a distillation flask. The temperature of the suspension is brought to 100° C. and 635 g of steam at atmospheric pressure are passed through. 635 g of distillate are collected.

The distillate is saturated with 230 g of sodium chloride, 77 g of sunflower oil are added, the whole is stirred for 5 minutes at ambient temperature and the fatty and aqueous phases are separated. The aromatic oil is put to one side and the operation is repeated twice with two new batches of sunflower oil. 230 g of aromatic oil, i.e. aromatic fat, are obtained.

200 g of decolored vegetable protein hydrolyzate, 150 g of technical leucine, 80 g of monosodium glutamate, 30 g of sodium chloride, 180 g of whey powder and 160 kg of a casein hydrolyzate prepared as described in Example 1 and having a degree of hydrolysis of 43.7% are dry-mixed, after which 200 g of the above aromatic fat are sprayed onto the dry ingredients while mixing. The mixture is homogenized and a flavouring product is obtained in the form of fine free-flowing particles of which the flavouring power is almost as high as that of the product of Example 1 and which is capable of imparting a balanced and characteristic flavour of cheese to sauces, dishes and snacks for example.

EXAMPLE 3

511 g of the shavings of Emmental crust described in Example 1 are suspended in 1020 g of water. The suspension obtained is adjusted to pH 4 and introduced into a distillation flask. The suspension is heated to 100° C. and 511 g of steam at atmospheric pressure are passed through it. 511 g of distillate are obtained.

The distillate thus obtained is purified by treating it for 30 minutes at 20° C. with 4 g of polystyrene resin free from functional groups.

The distillate is saturated with 184 g of sodium chloride, 62 g of sunflower oil are added, the whole is stirred for 5 minutes at ambient temperature and the fatty and aqueous phases are separated. The aromatic oil is put to one side and the operation is repeated twice more with new batches of sunflower oil. 185 g of aromatic oil, i.e. aromatic fat, are obtained.

220 g of acid vegetable protein hydrolysate, neutralized and decolored over active carbon, 150 g of technical leucine, 70 g of monosodium glutamate, 40 g of sodium chloride, 180 g of whey powder and 160 g of a casein hydrolysate prepared as described in Example 1 and having a degree of hydrolysis of 40.75% are dry-mixed, after which 180 g of the above aromatic fat are sprayed onto the dry ingredients while mixing. The mixture is homogenized, giving a flavouring product which differs from the product of Example 2 in that it imparts a slightly finer, characteristic cheese flavour whilst, at the same time, being as balanced and having a comparable flavouring power.

COMPARISON EXAMPLE

A flavouring product is prepared in the same way as described in Example 1, except that the casein is hydrolyzed to a lower degree, the casein hydrolyzate having a degree of hydrolysis of 29.8%. The product is considered by a panel of experienced tasters to impart a distinctly less balanced flavour than the product of Example 1.

We claim:

1. A flavouring product which imparts the flavour of cheese, characterized in that it contains from 5 to 40 parts by weight of vegetable protein hydrolyzate, from 3 to 20 parts by weight of leucine and from 15 to 30 parts by weight of aromatic fat containing aromatic substances from the crust of hard or semihard cheese.

2. A product as claimed in claim 1, characterized in that it additionally contains from 1 to 20 parts by weight of monosodium glutamate, from 1 to 5 parts by weight of sodium chloride, from 1 to 20 parts by weight of casein hydrolyzate and from 1 to 20 parts by weight of whey powder.

3. A product as claimed in claim 1, characterized in that the aromatic fat is the actual fat of the crust.

4. A product as claimed in claim 1, characterized in that the aromatic fat is a vegetable oil flavoured by aromatic substances extracted from the crust.

5. A product as claimed in claim 2, characterized in that the casein hydrolyzate has a degree of hydrolysis of 35 to 45 %.

6. A process for producing a flavouring product which imparts the flavour of cheese, characterized in that an aromatic fraction containing aromatic substances is separated from the crust of a hard or semihard cheese and made into an aromatic fat which is mixed in a quantity of from 15 to 30 parts by weight with from 5 to 40 parts by weight of vegetable protein hydrolyzate and from 3 to 20 parts by weight of leucine.

7. A process as claimed in claim 6, characterized in that from 1 to 20 parts by weight of monosodium glutamate, from 1 to 5 parts by weight of sodium chloride, from 1 to 20 parts by weight of casein hydrolyzate and from 1 to 20 parts by weight of whey powder are added to the mixture.

8. A process as claimed in claim 6, characterized in that the actual fat is directly separated from the crust by pressing and/or centrifuging to obtain the aromatic fat.

9. A process as claimed in claim 6, characterized in that the aromatic fraction is separated by stripping the crust with steam and the aromatic fat is prepared by extracting the aromatic substances from the distillate with a vegetable oil.

10. A process as claimed in claim 7, characterized in that the casein hydrolyzate has a degree of hydrolysis of from 35 to 45 %.

* * * * *

UNITED STATES PATENT AND TRADEMARK OFFICE
CERTIFICATE OF CORRECTION

PATENT NO. : 4,544,568
DATED : October 1, 1985
INVENTOR(S) : Sven Heyland, et al.

It is certified that error appears in the above—identified patent and that said Letters Patent is hereby corrected as shown below:

Column 5, line 45, "four timesthe" should read -- four times the--.

Column 6, line 67, "whi!st" should read -- whilst --.

Signed and Sealed this

Seventh Day of January 1986

[SEAL]

Attest:

DONALD J. QUIGG

Attesting Officer    Commissioner of Patents and Trademarks